United States Patent
Mehr et al.

(10) Patent No.: US 12,545,627 B2
(45) Date of Patent: Feb. 10, 2026

(54) REFRACTORY MATERIALS

(71) Applicant: Honeywell International Inc., Charlotte, NC (US)

(72) Inventors: Mehrad Mehr, Raleigh, NC (US); Bahram Jadidian, Watchung, NJ (US)

(73) Assignee: Honeywell International Inc., Charlotte, NC (US)

( * ) Notice: Subject to any disclaimer, the term of this patent is extended or adjusted under 35 U.S.C. 154(b) by 13 days.

(21) Appl. No.: 18/468,443

(22) Filed: Sep. 15, 2023

(65) Prior Publication Data

US 2025/0091958 A1   Mar. 20, 2025

(51) Int. Cl.
*C04B 35/571* (2006.01)
*C04B 35/622* (2006.01)
*C04B 35/65* (2006.01)

(52) U.S. Cl.
CPC ...... *C04B 35/571* (2013.01); *C04B 35/62222* (2013.01); *C04B 35/65* (2013.01); *C04B 2235/3826* (2013.01); *C04B 2235/428* (2013.01); *C04B 2235/483* (2013.01); *C04B 2235/663* (2013.01); *C04B 2235/9676* (2013.01); *C04B 2235/9684* (2013.01)

(58) Field of Classification Search
None
See application file for complete search history.

(56) References Cited

U.S. PATENT DOCUMENTS

| | | | | |
|---|---|---|---|---|
| 5,441,762 A | * | 8/1995 | Gray | C04B 41/52 427/419.7 |
| 8,137,802 B1 | * | 3/2012 | Loehman | B32B 9/005 428/408 |
| 8,323,796 B2 | * | 12/2012 | Schmidt | C04B 38/0022 428/408 |
| 11,351,696 B2 | | 6/2022 | Nelson et al. | |

(Continued)

FOREIGN PATENT DOCUMENTS

| | | |
|---|---|---|
| CN | 111187092 A | 5/2020 |
| EP | 2356085 B1 | 2/2013 |
| KR | 101170918 B1 | 8/2012 |

(Continued)

OTHER PUBLICATIONS

Yang et al., "Fabrication of Silicon Carbide (SiC) Coatings from Pyrolysis of Polycarbosilane/Aluminum", Journal of Inorganic and Organometallic Polymers and Materials, Mar. 25, 2011, p. 534-540.

*Primary Examiner* — Seth Dumbris
(74) *Attorney, Agent, or Firm* — Shumaker & Sieffert, P.A.

(57) ABSTRACT

A method includes forming an article from a silicon-rich refractory mixture. The silicon-rich refractory mixture includes a silicon-rich silicon carbide preceramic polymer and a silicon carbide powder. The method includes heating the preform to pyrolyze the silicon-rich silicon carbide preceramic polymer and form a silicon-rich refractory material. The silicon-rich refractory material includes the silicon carbide powder and excess silicon in a silicon carbide matrix. The method further includes heating the silicon-rich (Continued)

refractory material to oxidize at least a portion of the excess silicon and form a reinforced refractory material. The reinforced refractory material includes a silicon dioxide phase at grain boundaries of the silicon carbide powder.

20 Claims, 3 Drawing Sheets

(56) References Cited

U.S. PATENT DOCUMENTS

| | | | |
|---|---|---|---|
| 2019/0210928 A1* | 7/2019 | Bottiglieri | C04B 35/63488 |
| 2022/0250996 A1* | 8/2022 | Mehr | C04B 41/89 |

FOREIGN PATENT DOCUMENTS

| | | |
|---|---|---|
| KR | 101701797 B1 | 2/2017 |
| KR | 102007358 B1 | 8/2019 |
| RU | 2232736 C2 | 7/2004 |

* cited by examiner

REFRACTORY MATERIALS

TECHNICAL FIELD

The disclosure relates to refractory materials.

BACKGROUND

Refractory materials may be used in high temperature applications to aid in handling molten metals. For example, in foundries, refractory materials may be used to form or coat metal processing units, such as ladles and furnaces. Due to harsh conditions experienced during metal processing, the metal processing units may undergo corrosion and erosion, which may result in replacement of the entire metal processing unit.

SUMMARY

The disclosure describes systems and techniques for forming a component or coating from one or more refractory materials. A substrate or component, such as an aerospace or foundry component, may be a portion of a device or system that is subject to a relatively high temperature oxidative and abrasive environment, such as a hypersonic aerospace application having temperatures greater than about 1200 degrees Celsius (° C.) or a foundry application exposed to slag or other oxidative species. To prevent chemical species from degrading the component, surfaces of the refractory component that may be exposed to the oxidative species are dense and have a high resistance to penetration of the oxidative species.

In some examples, a coating or component is formed from a relatively dense refractory material using inexpensive feedstocks that resists degradation from particles or other sources of abrasion. The dense refractory material includes a polymer-derived silicon carbide matrix and silicon carbide powder in the silicon carbide matrix. To increase mechanical properties, such as mechanical strength, corrosion resistance, and shock resistance, of the refractory material, the refractory material includes a silicon dioxide phase formed at grain boundaries of the silicon carbide powder.

The refractory material is derived from a silicon-rich refractory mixture. The silicon-rich refractory mixture includes a small amount of the relatively expensive silicon carbide preceramic polymer and large amount of the relatively inexpensive silicon carbide powder. In a first heating stage, the mixture is pyrolyzed to form a silicon rich refractory material. In a second heating stage, the excess silicon of the silicon rich refractory material is oxidized to form the silicon dioxide phase that further reduces the porosity and increases the mechanical strength of the reinforced refractory material. In this way, relatively simple processes and inexpensive feedstocks may be used to form dense refractory components suitable for foundry applications.

In some examples, the refractory material may be used to form a coating on a substrate of an aerospace component. The coating may be applied as a paste having a silicon-rich refractory mixture to the surface of the substrate. The resulting coating may resist both migration of oxidizing species and abrasion by particles in a fluid. In other examples, the refractory material may be used to form a refractory component of a foundry system. The refractory component may be formed from a preform that is near net shape and molded from a silicon-rich refractory mixture. The resulting refractory component may resist both migration of oxidizing species and damage caused by equipment contacting a surface of the refractory component.

In one example, a method includes forming a coating on a substrate. The coating is formed from a silicon-rich refractory mixture that includes a silicon-rich silicon carbide preceramic polymer and a silicon carbide powder. The method further includes heating the coating to pyrolyze the silicon-rich silicon carbide preceramic polymer and form a silicon-rich refractory material. The silicon-rich refractory material includes the silicon carbide powder and excess silicon in a silicon carbide matrix. The method further includes heating the silicon-rich refractory material to oxidize at least a portion of the excess silicon and form a reinforced refractory material. The reinforced refractory material includes a silicon dioxide phase at grain boundaries of the silicon carbide powder.

In another example, an includes a substrate and a coating overlying the substrate. The coating includes a reinforced refractory material that includes a polymer-derived silicon carbide matrix, a silicon carbide powder in the silicon carbide matrix, and a silicon dioxide phase at grain boundaries of the silicon carbide powder.

In another example, a method includes forming a preform of a refractory component from a silicon-rich refractory mixture. The silicon-rich refractory mixture includes a silicon-rich silicon carbide preceramic polymer and a silicon carbide powder. The method further includes heating the preform to pyrolyze the silicon-rich silicon carbide preceramic polymer and form a silicon-rich refractory material. The silicon-rich refractory material comprises the silicon carbide powder and excess silicon in a silicon carbide matrix. The method further includes heating the silicon-rich refractory material to oxidize at least a portion of the excess silicon and form a reinforced refractory material. The reinforced refractory material includes a silicon dioxide phase at grain boundaries of the silicon carbide powder.

In another example, a refractory component includes a reinforced refractory material that includes a polymer-derived silicon carbide matrix, a silicon carbide powder in the silicon carbide matrix, and a silicon dioxide phase at grain boundaries of the silicon carbide powder.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes articles, such as high temperature articles of aerospace or foundry systems, that include refractory materials. Aerospace coating and/or refractory components made from refractory materials may be capable of operating in relatively high temperature oxidative environments. As one example, aerospace refractory materials may aid in protecting external components of a spacecraft from damage upon reentry. As another example, foundry refractory materials may aid in the handling of molten metals during metalworking, such as steelmaking. Various foundry systems, such as ladles, slide gates, and furnaces, may include refractory components, such as bricks, bulk materials, or liners, to assist in maintaining high temperatures of the molten metals and shield more sensitive components of the processing units and workers operating the processing units from the high temperatures. These refractory components may provide high resistance to oxidation and/or environmental attack at high temperatures experienced during operation or fabrication of aerospace components, as well as other types of components.

Refractory materials may be formed from relatively inexpensive refractory ceramic particles dispersed in a ceramic matrix. Despite a relatively high thermal and chemical stability of the refractory materials, the harsh environment of the abrasive particles or molten metals may erode and corrode the ceramic matrix of the refractory materials. As one example, coatings made from refractory materials may degrade when contacted with particles or other abrasive material in the air. As another example, ladles for processing steel may be formed from refractory materials that include refractory particles bonded by a carbon matrix. Slag and other byproducts of steel processing may oxidize the carbon and cause cracking or other degradation in the refractory materials. As a result, the refractory coatings or components may be periodically replaced or rebuilt.

Figure 1:
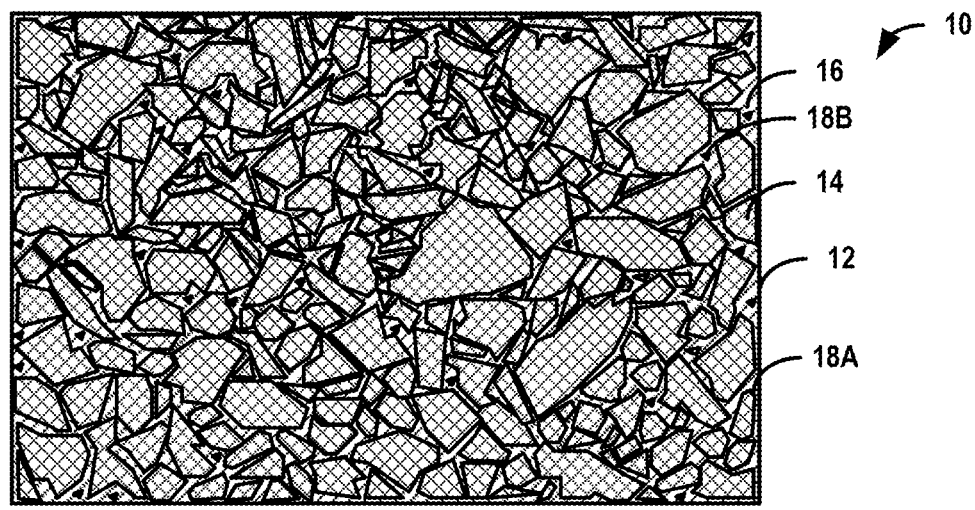
FIG. 1 is a cross-sectional expanded view diagram of an example refractory material formed in accordance with the techniques of this disclosure.

To resist high temperatures, resist migration of oxidative species, and/or resist abrasion or other impact, refractory materials described herein include silicon carbide particles fused by a silicon carbide matrix and reinforced with a silicon dioxide phase. FIG. 1 is a cross-sectional expanded view diagram of an example reinforced refractory material 10 formed in accordance with the techniques of this disclosure. Reinforced refractory material 10 may be a portion of a refractory coating or component having one or more surfaces 12 subject to high temperatures and oxidative conditions during operation. As one example, hypersonic applications may be exposed to temperatures above 3000 degrees Fahrenheit (° F.) (about 1650 degrees Celsius (C)) during reentry. As another example, metal processing components may be exposed to temperatures above 2200 degrees Fahrenheit (° F.) (about 1200 degrees Celsius (° C.)) during processing of superalloys and oxidative species such as silicon.

Reinforced refractory material 10 includes a silicon-rich polymer-derived silicon carbide matrix 16 and a silicon carbide powder (or aggregate) 14 in silicon carbide matrix 16. Silicon carbide powder 14 may form a tightly packed phase making up a high volume fraction of reinforced refractory material 10. Silicon carbide matrix 16 may form a binding phase making up a low volume fraction of reinforced refractory material 10.

Polymer-derived silicon carbide matrix 16 may include a silicon carbide ceramic material formed from decomposition of a preceramic polymer and subsequent formation of an amorphous and/or crystalline silicon carbide phase that maintains thermal and chemical stability at high temperatures, such as above about 1500° C. Silicon carbide may have properties that are particularly suited for a high temperature oxidative environment, including a high decomposition temperature, a relatively low crystallization temperature for one or more crystalline phases of the polymer-derived ceramic material, a low coefficient of thermal expansion, and compatibility and adhesion with the silicon carbide powder 14.

In some examples, silicon carbide matrix 16 may be present as a substantially (e.g., greater than 95% by volume) crystalline phase. As will be explained further below, silicon carbide matrix 16 may be substantially crystallized by heating silicon carbide matrix 16 above a crystallization temperature after pyrolysis of the preceramic polymer, such that silicon carbide matrix 16 is substantially free of glass/amorphous phases. For example, silicon carbide matrix 16 may include one or more crystalline phases distributed in an amorphous phase, such that the amorphous phase is less than about 5% by volume of the ceramic matrix.

Silicon carbide matrix 16 may be present in reinforced refractory material 10 in a distribution and volume fraction sufficient to bond particles of silicon carbide powder 14 together. For example, silicon carbide powder 14 may form a tightly packed aggregate with small voids between particles. Silicon carbide matrix 16 may fill these voids to secure and seal the particles. However, while silicon carbide matrix 16 may have relatively high thermal and oxidative resistance, a preceramic polymer used to form silicon carbide matrix 16 may be relatively expensive, such that a volume fraction of silicon carbide matrix 16 may be kept relatively small. In some examples, silicon carbide matrix 16 defines less than about 10 percent by volume of reinforced refractory material 10.

Silicon carbide powder 14 maintains thermal and chemical stability at temperatures at or above about 1500° C. Silicon carbide powder 14 may be present as a powder that includes relatively loose particles or an aggregate that includes relatively constrained (e.g., packed) particles. Various parameters of the particles, such as particle size, particle shape, and particle size distribution of silicon carbide powder 14 may be selected such that silicon carbide powder 14, once bonded in silicon carbide matrix 16, forms a tightly packed, mechanically robust material. In some examples, particle sizes may be from about 0.1 micrometers to about 500 micrometers.

In some examples, reinforced refractory material 10 is configured with a particular average particle size or shape and/or a particle size distribution of silicon carbide powder 14 within silicon carbide matrix 16. A density of reinforced refractory material 10 may be related to a compaction or packing density of silicon carbide powder 14. To increase the density of reinforced refractory material 10 and enhance its properties (e.g., pyrolysis, oxidation, and optionally, crystallization), a refractory mixture used to form reinforced refractory material 10 may include an extended distribution of particles sizes, such as a bimodal or trimodal distribution of particle sizes. A bimodal or trimodal particle size distribution may be configured to form a highly packed refractory material and increase the overall density of the materials and performance. The particle size distribution may vary based on a composition of the silicon carbide powder 14 and volume ratio of silicon carbide powder 14 to silicon carbide matrix 16. The distribution may determine packing. In some examples, a packing factor may be at least about 60% by volume, such as from about 60% to about 75%, depending on particle size distribution. "About" a particular packing factor may be within 10% of the value, such as within 5% or 1%, and may refer to an accuracy and capability of equipment used to measure the packing factor and/or control of manufacture of particles size and/or particle size distribution.

In some examples, such as examples in which reinforced refractory material 10 is used to form a refractory component, reinforced refractory material 10 is configured to maintain a near net shape of a refractory component before and after processing. A refractory component having a near net shape may have no or little shrinkage during pyrolysis. For example, prior to pyrolysis, a preform formed from a refractory mixture that includes silicon carbide powder 14 may be defined by a first volume corresponding to a first set of dimensions of the corresponding mold. After pyrolysis, the refractory component may be defined by a second volume corresponding to a final shape of the refractory component. In some examples, a near net shape is a difference between the first volume and the second volume that is less than about five percent by volume.

Prior to pyrolysis, silicon carbide powder 14 may be densely packed, such that grains of particles of silicon carbide powder 14 contact grains of adjacent particles. During pyrolysis of the silicon carbide preceramic polymer, the silicon carbide preceramic polymer may decompose into a higher density silicon carbide matrix. In a refractory mixture in which the refractory particles are not tightly packed, the refractory component may shrink and maintain a high density with a relatively low porosity. However, in a refractory mixture in which particles of silicon carbide powder 14 are tightly packed, the grains of the particles may continue to reinforce the shape of the refractory material.

When used as a bulk material for forming a refractory component, reinforced refractory material 10 may maintain a near net shape of the refractory component by resisting shrinkage. During pyrolysis, the silicon carbide preceramic polymer may locally shrink to form silicon carbide matrix 16, and may include small voids such that the refractory material may have slightly lower density. In some examples, the refractory material may include a porosity of voids that is substantially closed, such as greater than about 80 percent by volume closed pores. In this way, by tightly packing particles of silicon carbide powder 14, the refractory component may have a high density, enhanced mechanical properties, near net shape, a relatively high proportion of closed pores, and/or a low amount of relatively expensive silicon carbide matrix.

In some examples, refractory material 10 may include more than one particle composition of silicon carbide powder 14. Various properties of refractory material 10, such as effective coefficient of thermal expansion, may result from a combination of properties of silicon carbide powder 14 and silicon carbide matrix 16. In some examples, silicon carbide powder 14 may be part of a mix of more than one species, such that reinforced refractory material 10 may have properties resulting from a blend of refractory powders. For example, a mix of more than one species may be configured to enhance thermal shock, by include a blend of refractory powders having different elastic moduli, thermal conductivities, and/or thermal expansion coefficients to produce a refractory material having a particular bulk elastic modulus, thermal conductivity, and/or thermal expansion. In some examples, the refractory powder may include active species configured to interact with other species. For example, a mix of more than one species may include a species configured to react with oxidative species, such as oxygen. In some examples, a mix of more than one species may be configured to produce a refractory material at a particular grade associated with a price point. For example, a mix of more than one species may balance a cost of the various species with a quality (e.g., strength or stability) of the refractory material.

In some examples, reinforced refractory material 10 includes a particular volume ratio of silicon carbide matrix 16 to silicon carbide powder 14. As mentioned above, the volume ratio of silicon carbide matrix 16 to silicon carbide powder 14 may be kept relatively small to maintain a high amount of the more chemically and thermally stable silicon carbide powder 14 and/or to reduce a cost of the refractory material. For example, silicon carbide preceramic polymers may be relatively expensive, such that by maintaining a relatively low amount of silicon carbide matrix 16 sufficient to bind together silicon carbide powder 14, a cost of the refractory material may be relatively low. Such relatively low cost may be particularly important for components of foundry systems, which may use large amount of the refractory material in a piece of equipment that may have a high replacement schedule. In some examples, silicon carbide matrix 16 defines less than about 10 percent by volume of the refractory material, while silicon carbide powder 14 may define greater than 90 percent by volume of reinforced refractory material 10.

A refractory material that includes silicon carbide powder 14 in silicon carbide matrix 16 may be thermally stable at high temperatures and resistant to oxidation. However, such a refractory material may still be susceptible to oxidation over time. To further improve mechanical and/or chemical properties of the refractory material, reinforced refractory material 10 further includes a silicon dioxide phase 18A, 18B (generically, "silicon dioxide phase 18"). Silicon dioxide phase 18 may be configured to improve various mechanical and/or chemical properties of the refractory material including, but not limited to, increased mechanical strength, increased abrasion resistance, increased hardness, increased corrosion resistance, and increased thermal shock resistance.

Without being limited to any particular theory, silicon dioxide phase 18 may function as an interphase within reinforced refractory material 10 to further adhere silicon carbide powder 14 to silicon carbide matrix 16, such as by enhancing intergranular strength or grain boundary bonding strength. In the example of FIG. 1, silicon dioxide phase 18 includes a silicon dioxide phase at grain boundaries of silicon carbide powder 14 ("boundary phase 18A") and a silicon dioxide phase at pores ("pore phase 18B"). Boundary phase 18A may be present at an interface between silicon carbide powder 14 and silicon carbide matrix 16; pore phase 18B may be present within silicon carbide matrix 16.

Silicon dioxide phase 18 may constitute a relatively small volume fraction of reinforced refractory material 10. While silicon dioxide may improve mechanical properties of reinforced refractory material 10 in small amount, in large amount, the silicon dioxide may adversely affect reinforced refractory material 10. For example, as a content of silica increases, various properties of reinforced refractory material 10 may become more like silica than silicon carbide, such as reduced thermal resistance, reduced hardness, and reduced corrosion resistance. In some examples, silicon dioxide phase 18 is less than about 1 percent by volume of reinforced refractory material 10.

In some examples, silicon dioxide phase 18 may densify reinforced refractory material 10 by reducing a porosity of reinforced refractory material 10. For example, pore phase 18B may be formed in portions of silicon carbide matrix 16 that may have included open pores prior to formation of silicon dioxide in the pore. By filling at least a portion of the open pores with silicon dioxide, reinforced refractory material 10 may have an even lower porosity than a refractory material formed from only silicon carbide powder 14 and silicon carbide matrix 16. In some examples, reinforced refractory material 10 has a porosity that is less than or equal to about 5 volume percent (vol. %).

In some examples, reinforced refractory material 10 further includes silicon powder. As discussed below, reinforced refractory material 10 may be formed from a silicon-rich refractory mixture that forms an intermediate silicon-rich refractory material of silicon carbide powder 14 and silicon carbide matrix 16. The excess silicon in the silicon-rich refractory material may be provided by silicon powder. A portion of the silicon powder may not oxidize and may remain dispersed within silicon carbide matrix 16.

Figure 2:
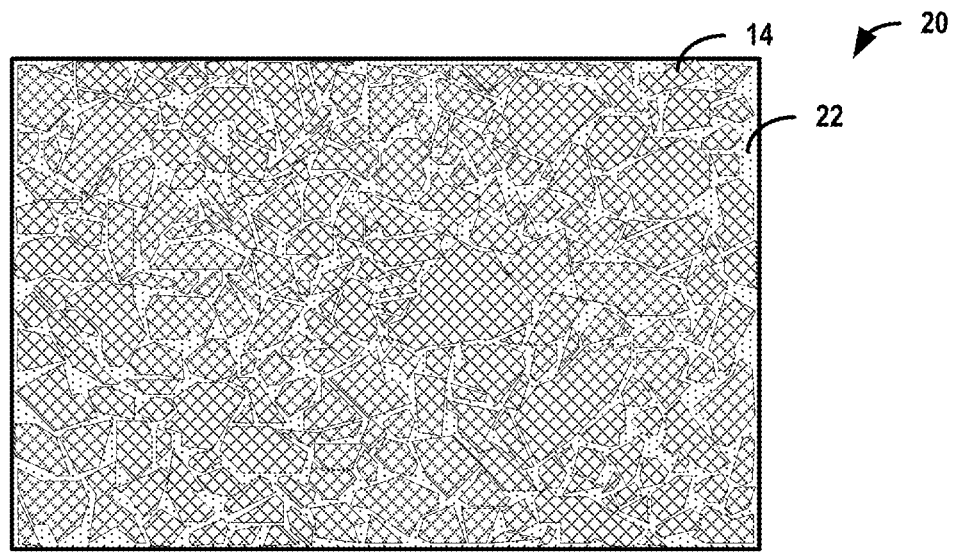
FIG. 2 is an expanded view diagram of an example refractory mixture in accordance with the techniques of this disclosure.

Refractory materials described herein are formed from a silicon-rich refractory mixture that includes a silicon carbide powder and a silicon-rich silicon carbide preceramic polymer. FIG. 2 is an expanded view diagram of an example silicon-rich refractory mixture 20 in accordance with the techniques of this disclosure. Refractory mixture 20 includes a liquid component 22 and a silicon carbide powder 14 dispersed in the liquid component.

Liquid component 22 includes a silicon-rich silicon carbide preceramic polymer. The silicon-rich silicon carbide preceramic polymer is configured to decompose to form an amorphous and/or crystalline silicon carbide phase that maintains thermal and chemical stability at high temperatures, such as above about 1500° C. Preceramic polymers may be relatively inexpensive for forming a silicon carbide matrix compared to chemical and physical deposition methods, such as chemical vapor deposition (CVD). The preceramic polymer may be selected for cost and desired properties of a resulting pyrolyzed, and optionally crystallized, silicon carbide matrix, such as silicon carbide matrix 16 of FIG. 1. A variety of silicon-rich silicon carbide preceramic polymers may be used including, but not limited to, polycarbosilanes, such as allylhydridopolycarbosilane (AHPCS); polycarbosiloxanes; polycarbosilazanes; and the like.

In some examples, the silicon-rich silicon carbide preceramic polymer may be selected for desired properties of refractory mixture 20 or a preform formed from refractory mixture 20. As one example, for refractory coatings, the preceramic polymer may be selected for fluid properties related to an ability to be applied as a paste and conform to a surface of an underlying substrate. As another example, for refractory components, the preceramic polymer may be selected for fluid properties related to an ability of refractory mixture 20 to flow during application to a mold, fluid or adhesive properties related to an ability of refractory mixture 20 to compact and maintain a compacted form as a preform prior to complete pyrolysis, and other properties related to dispersion and compaction of refractory mixture 20.

In some examples, the silicon-rich silicon carbide preceramic polymer is configured to aid in application of a coating formed from refractory mixture 20. For example, the preceramic polymer may function as a carrier to flow refractory mixture 20 in a desired thickness and with a desired conformance prior to pyrolysis of the preceramic polymer. The preceramic polymer may wet surfaces of silicon carbide powder 14 and surfaces of an underlying substrate. As a result, the coating formed from the silicon carbide powder 14 and the preceramic polymer may be continuous and substantially uniform. In examples for forming a coating from reinforced refractory material 10, the preceramic polymer in refractory mixture 20 is present in a concentration by weight between about 3 wt. % and about 10 wt. %.

In some examples, the silicon-rich silicon carbide preceramic polymer is configured to aid in adhesion of a preform formed from refractory mixture 20. For example, the preceramic polymer may function as a binder to adhere refractory mixture 20 in the desired shape as the preform prior to pyrolysis of the preceramic polymer. The preceramic polymer may wet surfaces of silicon carbide powder 14 and bind silicon carbide powder 14. As a result, the preform formed from the compacted silicon carbide powder 14 and the preceramic polymer may be structurally solid to resist at least forces from gravity and light handling. In examples for forming a coating from reinforced refractory material 10, the preceramic polymer in refractory mixture 20 is present in a concentration by weight between about 1 wt. % and about 5 wt. %.

The silicon carbide preceramic polymer is silicon-rich. The silicon carbide preceramic polymer is configured to decompose to form both a silicon carbide matrix, such as silicon carbide matrix 16, and excess silicon. The excess silicon may be available for oxidation and subsequent formation of a silicon dioxide phase, such as silicon dioxide phase 18 of FIG. 1. In some examples, the silicon-rich silicon carbide preceramic polymer may be a silicon carbide preceramic polymer that has been modified with excess silicon groups, such as polycarbosilanes mixed with polysiloxanes or other preceramic polymers having silicon-containing functional groups.

In some examples, refractory mixture 20 further includes silicon powder. For example, in addition to excess silicon provided by the silicon-rich silicon carbide polymer, silicon powder may further provide silicon for subsequent oxidation into silicon dioxide phase 18. In some examples, particle sizes of silicon powder are from about 10 nanometers to about 10 micrometers. For example, particle sizes in the nano-range may disperse more thoroughly than larger particles and, when melted, do not form large of pores. However, such particles may be difficult to process, as silicon dioxide may form on a surface of the particles. In some examples, the particle size is from about 500 nanometers to about 1 micron.

In some examples, the preceramic polymer may be cured prior to fully pyrolysis, such as through heating, to form a hardened coating or preform having increased integrity. For example, while paste application or compaction may form the refractory mixture into a coating or preform having a uniform thickness or compacted consistency, the coating or preform may still be brittle and prone to damage in response to drops or rough handling. A portion of the preceramic polymer, such as a portion near a surface of the refractory coating or component, may be heated above a curing temperature to cure the portion of the preceramic polymer and protect the coating or preform from damage. In some examples, the curing temperature may be greater than about 100° C. and less than about 250° C., and may be dependent on the particular preceramic polymer.

In some examples, refractory mixture 20 may be configured to be applied as a paste that is subsequently heated. The paste may be formed into a coating having a predetermined thickness corresponding to a desired thickness of the final coating. As such, refractory mixture 20 may have various flow properties related to an ability of refractory mixture 20 to flow or move onto surface of the substrate and/or various adhesion properties related to an ability of refractory mixture 20 to form a relatively uniform and conforming coating after application. As one example, for a substrate with relatively complex features, refractory mixture 20 may have a relatively low viscosity, such that refractory mixture 20 may be applied to the surface of the substrate and flow onto portions of the surface having the relatively complex features. On the other hand, for a substrate with relatively simple features, refractory mixture 20 may have a relatively high viscosity corresponding to a lower volume fraction of the preceramic polymer, thereby reducing an amount of the preceramic polymer.

In some examples, refractory mixture 20 may be configured to be cast into a preform that is subsequently heated. The preform may have a predetermined shape generally corresponding to a final shape of a refractory component. As such, refractory mixture 20 may have various flow properties related to an ability of refractory mixture 20 to flow or move into a mold and/or various adhesion properties related to an ability of refractory mixture 20 to form preform after pressurization. As one example, for a component with relatively complex features, refractory mixture 20 may have a relatively low viscosity, such that refractory mixture 20 may be injected into the mold and flow into portions of the mold having the relatively complex features. On the other hand, for a component with relatively simple features, refractory mixture 20 may have a relatively high viscosity, such that refractory mixture 20 may be compacted, such as with a pellet press, into the mold.

In some examples, refractory mixture 20 may have a particular ratio of liquid component 22 to silicon carbide powder 14. The ratio of liquid component 22 to silicon carbide powder 14 may be related to a number of flow or adhesion properties of refractory mixture 20, such as viscosity and/or dispersibility. For example, the ratio of liquid component 22 to silicon carbide powder 14 may be sufficiently high that the preceramic polymer and silicon carbide powder 14 may be evenly distributed throughout refractory mixture 20; sufficiently high that refractory mixture 20 may flow onto a surface or into a mold; and/or sufficiently low that refractory mixture 20 may maintain a uniform coating after application or a solid, compacted preform after compaction and prior to complete pyrolysis. In some examples, refractory mixture 20 has a volume ratio of liquid component 22 to silicon carbide powder 14 that is less than or equal to about 1:5. For example, as mentioned above, refractory mixture 20 may have a relatively lower volume ratio of liquid component 22 to silicon carbide powder 14 for forming a refractory component, which may use compaction, than for forming a coating, which may use spray or other lower force distribution method.

In some examples, a composition, particle size or shape, and/or particle size distribution of refractory mixture 20 may be selected to produce a resulting refractory material that is relatively free of thermal defects, such as cracking caused by changes in temperature during pyrolysis or crystallization. For example, during pyrolysis of the preceramic polymer, the preceramic polymer may change dimension due to shrinkage from release of various volatiles, thermal expansion, or other dimensional change due to temperature. This dimensional change may be different than a dimensional change of silicon carbide powder 14, such as due to a different coefficient of thermal expansion or a relatively lower chemical stability of the preceramic polymer. As such, refractory mixture 20 used to form the refractory material may be configured with a composition, particle size or shape, and/or particle size distribution such that, during various processing steps, such as painting, casting, pressurizing, drying, and/or heating, the refractory material and various intermediates of the refractory material may not experience degradation.

Figure 3:
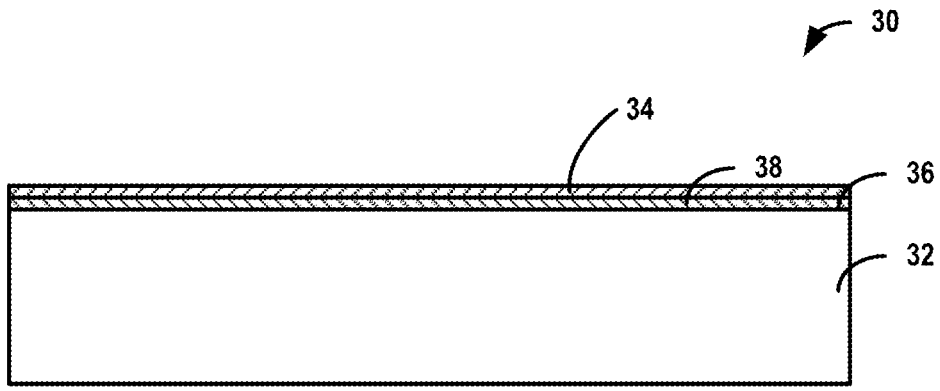
FIG. 3 is a cross-sectional side view diagram of a portion of an example aerospace component formed in accordance with the techniques of this disclosure.

Refractory components described herein may be used in a variety of high temperature applications. In some examples, the refractory materials may be used as a coating to protect substrates in a high temperature oxidative environment, such as aerospace applications. FIG. 3 is a cross-sectional side view diagram of a portion of an example component 30 of an aerospace system formed in accordance with the techniques of this disclosure. Component 30 may include any component of an aerospace system that is configured to interface with an environment having temperatures greater than about 1200° C., such as components of combustion systems and/or external components configured to contact air.

Component 30 includes a substrate 32. Substrate 32 may include any material that is thermally stable at temperatures of greater than or equal to about 1200° C. In some examples, substrate 32 is a ceramic matrix composite (CMC). For example, substrate 32 may include reinforcement fibers and a matrix material at least partially surrounding the reinforcement fibers. While substrate 32 may be relatively resistant to relatively high temperatures, substrate 32 may be susceptible to degradation by oxidative species and/or thermal degradation at very high temperatures, such as greater than about 1500° C. CMCs that may be used for substrate 32 include, but are not limited to, carbon/carbon, carbon/silicon carbide, silicon carbide/silicon carbide, or the like.

To protect substrate 32 from oxidative species, component 30 includes one or more coatings on a surface 38 of substrate 32. In the example of FIG. 3, component 30 includes a silicon carbide coating 36 overlying substrate 32 and a refractory coating 34 overlying silicon carbide coating 36. Surface 38 may include surfaces intended for contact with an oxidative environment, and may only be a portion of substrate 32.

Refractory coating 34 is formed from reinforced refractory material, such as reinforced refractory material 10 of FIG. 1. As described above, reinforced refractory material 10 includes a silicon-rich polymer-derived silicon carbide matrix 16 and a silicon carbide powder 14 in silicon carbide matrix 16. Silicon carbide powder 14 may form a tightly packed phase making up a high volume fraction of reinforced refractory material 10. Silicon carbide matrix 16 may form a binding phase making up a low volume fraction of reinforced refractory material 10. Coating 34 may be stable at temperatures of up to about 3600° F. (about 2000° C.), such that coating 34 does not degrade into its constituent elements, does not react with carbon, and/or does not react with other elements or compounds present in the environment in which coating 34 is used including, but not limited to, oxidation, for a period of time (e.g., minutes or hours). Coating 34 may have any suitable thickness. In some examples, a thickness of coating 34 may be about 1 micrometer (μm) to about 100 μm. Reinforced refractory materials may have a variety of properties that support substrate 112, such as high mechanical strength, high thermal stability, low porosity, and/or good adhesion to substrate 32.

In some examples, refractory coating 34 may not strongly adhere directly to substrate 32. For example, substrate 32 may include a carbon matrix with substantial surface porosity, such that substrate 32 and coating 34 have low compatibility. To improve adhesion of refractory coating 34 to substrate 32, component 30 includes metal carbide layer 36 between substrate 32 and refractory coating 34. Metal carbide layer 36 may be configured to adhere to underlying substrate 32 and form a relatively uniform surface for adhering to coating 34. Layer 36 may have any suitable thickness. In some examples, a thickness of layer 36 may be about 1 micrometer (μm) to about 100 μm, and may be non-uniform within layer 36. In some examples, a thickness of layer 36 may be self-terminating and determined by diffusion properties of the metal carbon system and/or deposition properties of a carbon layer.

Metal carbide layer 36 includes a silicon carbide. Metal carbides may have high strength, wear-resistance, and temperature resistance, particularly as compared to substrate 32, and may be chemically compatible with underlying substrate 32. In some examples, the metal carbide includes at least one of silicon carbide, titanium carbide, or tungsten carbide. In some examples, metal carbide layer 36 includes silicon carbide. Silicon carbide may have properties that are particularly suited for a high temperature oxidative environment, including a high decomposition temperature, a relatively low crystallization temperature for one or more crystalline phases of metal carbide layer 36, a low coefficient of thermal expansion, ability to form a passivating oxide layer, and compatibility and adhesion with porous refractory substrate 32. Metal carbide layer 36 extends across and fills surface voids on the surface of substrate 32 to form a uniform, defect-free, and continuous layer that substantially encapsulates substrate 32.

In some examples, metal carbide layer 36 is formed by reacting a metal, such as in a metal slurry, with carbon at or on a surface of substrate 32. For example, substrate 32 may include a carbon matrix or a carbon layer overlying a matrix that extends across surface 38 of substrate 32. Portions of metal carbide layer 36 may extend across and substantially seal surface voids (e.g., seal all surface voids or nearly all surface voids, such as 90% or more) in the surface of substrate 32 to form a substantially continuous layer.

Figure 4:
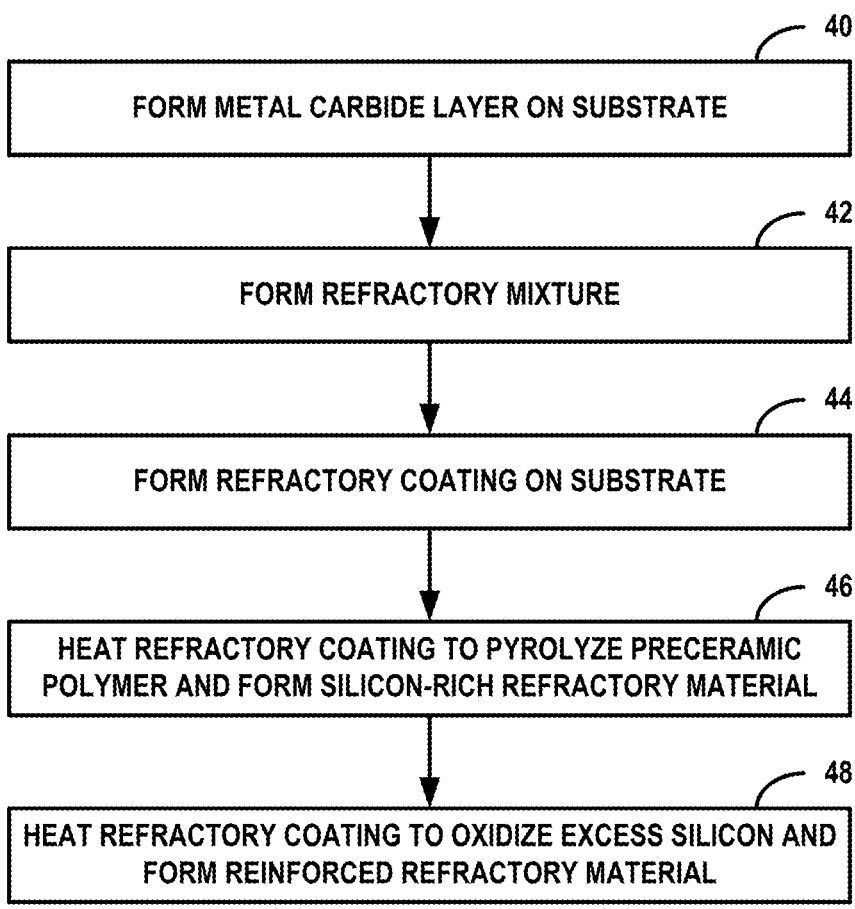
FIG. 4 is a flow diagram illustrating an example technique for forming a coating for an aerospace component in accordance with the techniques of this disclosure.

FIG. 4 is a flow diagram illustrating an example technique for forming a coating for a component, such as an aerospace component, in accordance with the techniques of this disclosure. FIG. 4 will be described with respect to reinforced refractory material 10 of FIG. 1 and refractory mixture 20 of FIG. 2 as applied to component 30 of FIG. 3.

In some examples, the technique of FIG. 4 includes forming a metal carbide layer on a substrate, such as metal carbide layer 36 on substrate 32. Articles described herein may include metal carbide layer 36 formed in situ on substrates 32 to form dense intermediate coatings that may encapsulate substrate 32. Substrate 32 may define an outer surface that includes one or more surface voids. Voids may include any irregularity or deviation from a general plane of the surface that may otherwise be susceptible to migration of oxidizing species, such as one or more pores, one or more cracks, and/or one or more surface projections or depressions. These voids may be formed during formation of substrate 32, and may have relatively complex surfaces that define relatively complex volumes that may be difficult to fill. For example, relatively large reactant particle size and/or high slurry viscosity may limit penetration of metal reactants into the voids.

To form metal carbide layer 36, the technique of FIG. 4 may include forming a carbon layer on the surface of substrate 32. Forming the carbon layer may include depositing a carbon layer on a surface of substrate 32 or abrading an outer layer of the surface of substrate 32, such that carbon of the carbon layer fills surface voids on the surface of substrate 32. Depositing the carbon layer on the surface may include depositing carbon on exposed portions of the surface, including surfaces within voids (e.g., at least partially fill the surface voids with carbon), such that carbon may penetrate into surface voids and extend across surface voids. Carbon may be deposited until a desired thickness of the carbon layer is reached. In some examples, the carbon layer is formed from a solid carbon form, such as a carbon powder.

In such examples, depositing the carbon layer on the surface of substrate 32 may include applying carbon powder, such as from a slurry or mixture, to the surface of substrate 32. For example, carbon powder having a particular composition and/or morphology may be selected or obtained and applied to the surface. In some examples, depositing the carbon layer on the surface of substrate 32 includes applying a force to the surface to force and pack carbon powder into the voids. For example, the force may include a normal force to the surface and/or any lateral forces to spread and/or fill voids. The force applied to carbon powder may force carbon powder into surface voids prior to forming a metal carbide and pack carbon powder into surface voids, such that carbon powder is retained in surface voids, such as up to between about 50 vol. % and about 60 vol. % packing, to form the carbon layer. In some instances, a carrier medium may be applied to the carbon powder, such as a volatile medium to aid in dispersing carbon powder into voids. For example, carbon powder may be dispersed in the carrier medium to form a slurry corresponding to a relatively high packing. A variety of methods may be used to force and pack carbon powder into surface voids including, but not limited to one or more of: rotary forces, such as polishing or abrasion; linear forces, such as spackling; manual forces, such as manual sanding (e.g., to generate and force carbon powder); or the like.

In some examples, the carbon layer is formed from a gaseous precursor, such as by using chemical vapor deposition (CVD). For example, depositing the carbon layer on the surface may include positioning substrate 32 in a reaction chamber, introducing a carbon precursor to an atmosphere in contact with the surface of substrate 32, and creating operating conditions, such as temperature and/or pressure conditions, that are configured to decompose the carbon precursor to form the carbon layer. Various operating parameters of CVD may include, but are not limited to, temperature, pressure, precursor/gas inflow, precursor type (e.g., methane, other hydrocarbons, or carbon source). Microstructural properties of the carbon layer that may result from controlling the various operating parameters include, but are not limited to, good bonding (e.g., surface conformance, adhesion, etc.) to the surface, uniformity of thickness, bridging of defects and voids, smooth surface, fast coating time, and the like.

In some examples, the carbon layer has a substantially uniform composition and morphology across the surface. For example, the microstructure and/or crystallinity of the carbon layer may be substantially the same at various portions of the carbon layer, and so may have a substantially same reaction thermodynamics and kinetics across the carbon layer, such that reaction of an infiltrated metal with the carbon layer may occur at substantially the same temperature and substantially the same rate across the carbon layer. As explained above, reaction thermodynamics and kinetics of the carbon layer may be a product of a respective type, feedstock source, processing history, and other properties and conditions of the carbon layer that influence a temperature and rate at which the carbon layer may react with an infiltrated metal. The resulting carbon layer may have a uniform composition and morphology, may be generated proximate to voids, and may penetrate into voids with or without the use of a carrier medium.

After deposition of the carbon layer, a metal slurry may be applied to the surface of the carbon layer. The metal slurry may include metal particles in an application medium. In some examples, the metal particles of the metal slurry include at least one of silicon, titanium, or tungsten. The metal particles may be coated by a thin layer of a metal oxide, such as may be formed in an oxidizing atmosphere during formation or shelf-life of the metal particles. For example, a relatively pure feedstock of metal particles may be prohibitively expensive due to inert storage, such that use of metal particles that include a metal oxide film may broaden available feedstocks of material for the metal particles and/or reduce a cost of the metal particles.

The metal of the metal slurry is reacted with carbon of the carbon layer to form metal carbide layer 36 on substrate 32, such that metal carbide layer 36 fills the surface voids on the surface of substrate 32. To react the metal of the metal slurry with the carbon of the carbon layer, the metal may be fluidized (e.g., melted or sublimated) such that the metal may infiltrate into the carbon layer and react with carbon of the carbon layer to form a metal carbide. This metal carbide may form a continuous metal carbide layer 36 to substantially seal substrate 32. In some examples, the metal of the metal slurry includes silicon, and the metal carbide of metal carbide layer 36 includes silicon carbide. In some instances, this reaction may be limited by diffusion of the metal into the carbon layer. As the metal reacts with the carbon of the carbon layer and forms a metal carbide, the newly formed metal carbide may form a diffusion barrier separating the reactants (e.g., carbon and metal), which may stop the thickening and further creation to form thicker metal carbides (e.g., by preventing metal from further penetrating into a depth of the carbon layer and/or preventing diffusion of carbon out of the carbon layer to react with the metal). For example, the metal carbide may have a low surface porosity, such as less than about 1%. The resulting layer 36 may be a relatively homogeneous metal carbide having a relatively uniform thickness that may include some deviations to fill voids. In some examples, a thickness of metal carbide layer 36 is less than about 50 microns, such as about 10 microns to about 20 microns.

Reaction of the metal of the metal slurry with the carbon of the carbon layer may be performed under stoichiometric excess of the metal, such that the resulting metal carbide layer 36 is metal-rich. Metal-rich may include a metal carbide phase that includes excess free metal. For example, a metal-rich metal carbide phase may include a stoichiometric ratio of the metal to the carbon of the carbon layer that is greater than 1:1, such as greater than about 1.001:1. By performing the reaction at stoichiometric excess of the metal, the resulting metal carbide layer 36 may include excess metal. During formation of metal carbide layer 36 or during operation of the refractory component (e.g., as a component), the excess metal may form a metal oxide. In some instances, the metal oxide may form a passivation layer that further protects substrate 32. In some instances, the metal oxide may perform a self-healing function for metal carbide layer 36. For example, the metal oxide may migrate into small cracks that may form during operation, such as due to mismatch in coefficient of thermal expansion (CTE) or volumetric expansion, and seal the cracks.

In some examples, reacting the metal of the metal slurry with the carbon of the carbon layer includes heating the surface of substrate 32, including the carbon layer and the metal slurry, above a melting point of the metal and maintaining a vapor pressure of the metal at the surface of substrate 32 in stoichiometric excess. A variety of parameters, such as a temperature at the surface, a concentration (e.g., as indicated by pressure) of the metal at the surface, and a time of reaction, may be controlled to maintain the metal at stoichiometric excess and encourage migration of the metal into, and reaction with, the carbon layer.

The technique of FIG. 4 includes forming a silicon-rich refractory mixture (42), such as refractory mixture 20 of FIG. 2. Refractory mixture 20 includes a silicon-rich silicon carbide preceramic polymer and silicon carbide powder 14. Refractory mixture 20 may be formed by at least mixing the silicon-rich silicon carbide preceramic polymer, silicon carbide powder 14, and any solvents and/or dispersants. In some examples, the silicon-rich silicon carbide preceramic polymer is present in an amount such that a resulting silicon carbide matrix defines less than about 10 percent by weight of reinforced refractory material 10, such as less than about 20 percent by weight. In some examples, refractory mixture 20 further includes silicon powder. A silicon content of the silicon-rich silicon carbide preceramic polymer and/or a volume fraction of silicon powder in refractory mixture 20 may be selected such that excess silicon forms silicon dioxide phase 18 having a low volume fraction, such as less than about 1 vol. %.

Refractory mixture 20 may include a proportion of a solvent sufficient to substantially mix refractory mixture 20 into a well-dispersed mixture, and may depend on the particular silicon carbide preceramic polymer and method of mixing. In some examples, the solvent is present at a concentration greater than about 5 percent by volume, such as from about 5 percent by volume to about 10 percent by volume. In some examples, a proportion of solvent in silicon-rich refractory mixture 20 may be modified to tailor the viscosity of silicon-rich refractory mixture 20. For example, an amount of solvent ideal for evenly mixing silicon-rich refractory mixture 20 may be different from an amount of solvent ideal for dispersing silicon-rich refractory mixture 20 into a mold or other form. As such, an amount of solvent may be added or removed to provide a desired consistency of refractory mixture 20 prior to forming a coating.

The technique of FIG. 4 further includes forming a coating from a refractory mixture on a substrate, such as coating 34 from refractory mixture 20 on surface 38 of substrate 32 (44). For example, refractory mixture 20 may be applied, such as by spraying, painting, dipping, or other deposition method, to one or more surfaces of a component of an aerospace system that may encounter a high temperature oxidative environment.

The method includes heating the coating to pyrolyze the silicon-rich silicon carbide preceramic polymer and form a silicon-rich refractory material (46). The coating may be heated to a heat treatment temperature in an inert atmosphere or under vacuum. The heat treatment temperature is sufficiently high, such as above a pyrolysis temperature, to pyrolyze the preceramic polymer of the coating and form silicon carbide matrix 16. For example, a typical silicon carbide preceramic polymer, such as AHPCS, may begin to pyrolyze at about 450° C. and fully pyrolyze by 900° C. The heating of the preform at least partially (e.g., substantially fully) pyrolyzes the silicon carbide preceramic precursor. The decomposition of the preceramic polymer to silicon carbide matrix 16 may result in shrinkage of the preceramic polymer. For example, the preceramic polymer may decompose from a density, such as about 1 gram/centimeter (g/cm) into amorphous silicon carbide having a density of about 2.5 g/cm. The resulting silicon-rich refractory material includes silicon carbide powder 14 and excess silicon in silicon carbide matrix 16. In some examples, the excess silicon includes silicon particles in silicon carbide matrix 16.

In some example processes, the heat treatment temperature is sufficiently high, such as above a crystallization temperature, to crystallize silicon carbide matrix 16. Continuing with the example of AHPCS above, silicon carbide matrix 16 may be heated above 900° C. and begin crystallizing at about 1200° C., with full crystallization occurring at about 1500° C.-1600° C. The heat treatment temperature may be sufficiently high to convert most or all of a glassy phase into one or more crystalline phases. In some examples, heat treatment temperature may be greater than about 950° C. for several hours, such as about 1425° C. The resulting refractory material includes silicon carbide powder 14 and excess silicon in silicon carbide matrix 16.

The method includes heating the coating to oxidize at least a portion of the excess silicon and form a reinforced refractory material (48), such as reinforced refractory material 10 of FIG. 1. Excess silicon that is present as silicon powder or formed from pyrolysis of the silicon-rich silicon carbide preceramic polymer may be distributed throughout silicon carbide matrix 16. Upon heating, the excess silicon may migrate to grain boundaries of silicon carbide powder 14 and/or voids within the refractory material and react with oxygen to oxidize and form silicon dioxide phase 18. As a result, reinforced refractory material 10 includes a silicon dioxide phase 18 at grain boundaries of silicon carbide powder 14.

To form silicon dioxide phase 18, the refractory material may be heated above 800° C. in an oxidizing atmosphere. The heat treatment temperature may be sufficiently high to thermally convert most or all of the excess silicon into silicon dioxide. In some examples, heat treatment temperature may be greater than about 800° C. for several hours, such as up to about 1200° C.

Figure 5:
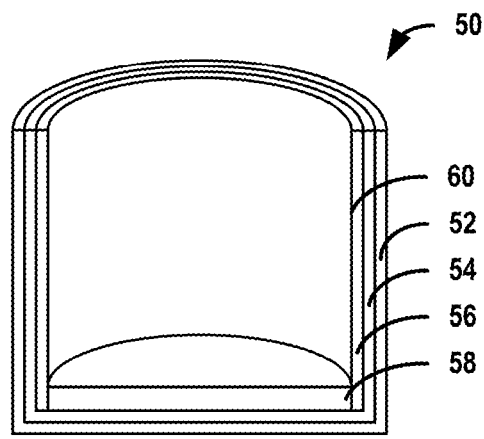
FIG. 5 is a cross-sectional perspective view diagram illustrating an example vessel that includes a refractory component formed in accordance with the techniques of this disclosure.

While the refractory materials described herein may be used as refractory components for aerospace application, the refractory materials may be used for other applications in which a high temperature oxidative environment is present, such as metal processing applications. FIG. 5 is a cross-sectional perspective view diagram illustrating an example vessel 50 that includes a refractory component 56 formed in accordance with the techniques of this disclosure. FIG. 5 illustrates an example of an example high temperature article (vessel 50) configured to handle molten materials. Such high temperature articles include one or more surfaces that contact molten metal and experience high temperatures conducive to oxidation, and so may include refractory components to resist oxidation.

Vessel 50 includes a casing 52, an insulating layer 54, refractory component 56, and a bottom 58 that may include a heating system (not shown). Refractory component 56 is an innermost component contacting contents of vessel 50, insulating layer 54 is positioned around refractory component 56 to retain heat within vessel 50, and casing 52 is positioned around insulating layer 54 to contain insulating layer 54 and provide structure to vessel 50. Vessel 50 may be configured to process molten metal, such as steels. For example, vessel 50 may be a crucible for melting metal or a ladle for transporting molten metal. Surfaces of vessel 50 in contact with molten metal may experience oxidation and corrosion due to impurities in the metal. For example, melting various metals used for steel may cause calcium and silicon to come into solution and form byproducts such as calcium-rich silicates.

To help resist corrosion and oxidation from these byproducts, vessel 50 includes refractory component 56. Refractory component 56 may form at least a portion of an interior portion of vessel 50, and may include an oxidation-resistant surface 60 configured to contact molten metal. While refractory component 56 is illustrated as being a monolithic component, refractory component 56 may be formed from one or more portions, such as bricks. As discussed above, in some examples, refractory component 56 includes a refractory material formed from silicon carbide particles fused by a silicon carbide matrix that includes a reinforcing and reinforcing silicon dioxide phase.

Figure 6:
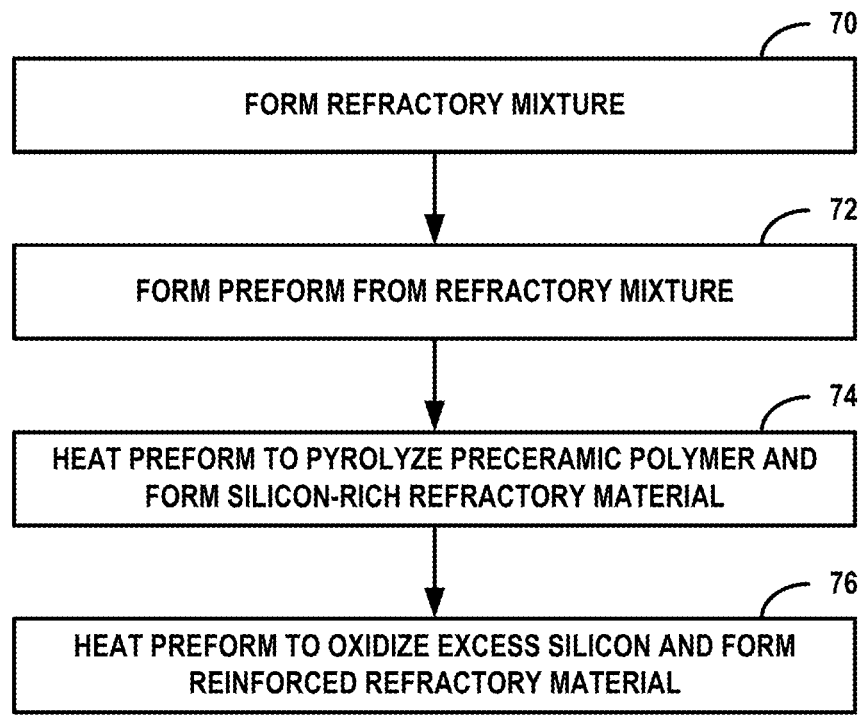
FIG. 6 is a flow diagram illustrating an example technique for forming a refractory component in accordance with the techniques of this disclosure.

FIG. 6 is a flow diagram illustrating an example technique for forming a refractory component in accordance with the techniques of this disclosure. FIG. 6 will be described with respect to reinforced refractory material 10 of FIG. 1 and refractory mixture 20 of FIG. 2. The technique of FIG. 6 includes forming a silicon-rich refractory mixture (70), such as refractory mixture 20 of FIG. 2 and similar to step 42 of FIG. 4. However, refractory mixture 20 may include a proportion of a solvent sufficient to substantially mix refractory mixture 20 into a well-dispersed mixture that is capable of being compacted into a preform. In some examples, the solvent is present at a concentration greater than about 5 percent by volume, such as from about 5 percent by volume to about 10 percent by volume. In some examples, a proportion of solvent in silicon-rich refractory mixture 20 may be modified to tailor the viscosity of silicon-rich refractory mixture 20. For example, an amount of solvent ideal for evenly mixing silicon-rich refractory mixture 20 may be different from an amount of solvent ideal for dispersing silicon-rich refractory mixture 20 into a mold or other form. As such, an amount of solvent may be added or removed to provide a desired consistency of refractory mixture 20 prior to forming a preform.

The technique of FIG. 6 includes forming a preform from the silicon-rich refractory mixture (72). Initially, refractory mixture 20 may include silicon carbide powder 14 and liquid component 22, including the preceramic polymer and optionally the solvent or dispersant, as a fluid or paste. To form the preform, refractory mixture 20 may be compacted to compress silicon carbide powder 14 and increase a density of refractory mixture 20. The preform may be formed to a near net shape, as dimension of preform and dimensions of the end refractory component may be substantially similar. For example, the preform may be defined by a first volume, the refractory component is defined by a second volume, and a difference between the first volume and the second volume is less than about five percent by volume.

In some examples, forming the preform from refractory mixture 20 includes pressure casting refractory mixture 20 into a predetermined shape of the preform. Pressure casting refractory mixture 20 may include applying refractory mixture 20 into a mold having the predetermined shape and compressing, using a pressurization system, refractory mixture 20 in the mold to at least partially cure refractory mixture 20 into a preform.

The technique of FIG. 6 includes heating the preform to pyrolyze the silicon-rich silicon carbide preceramic polymer and form a silicon-rich refractory material (74) and heating the preform to oxidize at least a portion of the excess silicon and form a reinforced refractory material (76), such as reinforced refractory material 10 of FIG. 1, such as described in steps 46 and 48 of FIG. 4.

Example 1: A method includes forming a coating on a substrate, wherein the coating is formed from a silicon-rich refractory mixture that comprises: a silicon-rich silicon carbide preceramic polymer; and a silicon carbide powder; heating the coating to pyrolyze the silicon-rich silicon carbide preceramic polymer and form a silicon-rich refractory material, wherein the silicon-rich refractory material comprises the silicon carbide powder and excess silicon in a silicon carbide matrix; and heating the silicon-rich refractory material to oxidize at least a portion of the excess silicon and form a reinforced refractory material, wherein the reinforced refractory material includes a silicon dioxide phase at grain boundaries of the silicon carbide powder.

Example 2: The method of example 1, wherein the silicon carbide matrix defines less than about 10 percent by volume of the reinforced refractory material.

Example 3: The method of any of examples 1 and 2, wherein a porosity of the reinforced refractory material has a porosity that is less than or equal to about 5 volume percent (vol. %).

Example 4: The method of any of examples 1 through 3, wherein the silicon-rich refractory mixture further comprises silicon powder.

Example 5: The method of any of examples 1 through 4, further comprising forming the refractory mixture by at least mixing the silicon-rich silicon carbide preceramic polymer and the silicon carbide powder.

Example 6: The method of any of examples 1 through 5, wherein the substrate comprises a component of an aerospace system.

Example 7: The method of any of examples 1 through 6, wherein heating the coating further comprises heating the silicon carbide preceramic polymer above a pyrolysis temperature to pyrolyze the silicon carbide preceramic polymer into the silicon carbide matrix.

Example 8: The method of example 7, wherein heating the coating further comprises heating the silicon carbide matrix above a crystallization temperature to crystallize the silicon carbide matrix.

Example 9: The method of any of examples 1 through 8, further comprising, prior to forming the coating on the substrate, forming a metal carbide layer on the substrate, wherein the coating is formed on a surface of the metal carbide layer.

Example 10: The method of example 9, wherein forming the metal carbide layer further comprises: depositing a carbon layer on a surface of the substrate, wherein a melting point of the substrate is greater than or equal to about 1500 degrees Celsius (° C.); applying a metal slurry to a surface of the carbon layer following the deposition of the carbon layer; and reacting a metal of the metal slurry with carbon of the carbon layer to form the metal carbide layer on the substrate.

Example 11: The method of example 10, wherein a porosity of the substrate is greater than about 10 percent by volume (vol. %), and wherein a porosity of the metal carbide layer is less than about 5 vol. %.

Example 12: The method of any of examples 10 and 11, wherein the metal of the metal slurry comprises silicon, and wherein the metal carbide layer comprises silicon carbide.

Example 13: An article includes a substrate; and a coating overlying the substrate, wherein the coating comprises a reinforced refractory material includes a polymer-derived silicon carbide matrix; a silicon carbide powder in the silicon carbide matrix; and a silicon dioxide phase at grain boundaries of the silicon carbide powder.

Example 14: The article of example 13, wherein the silicon carbide matrix comprises less than about 10 percent by volume of the reinforced refractory material.

Example 15: The article of any of examples 13 and 14, wherein the silicon dioxide phase comprises less than about 1 percent by volume of the reinforced refractory material.

Example 16: The article of any of examples 13 through 15, wherein a porosity of the reinforced refractory material is less than or equal to about 5 volume percent (vol. %).

Example 17: The article of any of examples 13 through 16, wherein the reinforced refractory material further comprises silicon powder.

Example 18: The article of any of examples 13 through 17, wherein the substrate comprises a component of an aerospace system.

Example 19: The article of any of examples 13 through 18, further comprising a metal carbide layer on a surface of the substrate, wherein the coating overlies the metal carbide layer, and wherein a melting point of the substrate is greater than or equal to about 1500 degrees Celsius (° C.).

Example 20: The article of example 19, wherein the metal carbide layer comprises silicon carbide.

Example 21: A method includes forming a preform of a refractory component from a silicon-rich refractory mixture, wherein the silicon-rich refractory mixture comprises: a silicon-rich silicon carbide preceramic polymer; and a silicon carbide powder; heating the preform to pyrolyze the silicon-rich silicon carbide preceramic polymer and form a silicon-rich refractory material, wherein the silicon-rich refractory material comprises the silicon carbide powder and excess silicon in a silicon carbide matrix; and heating the silicon-rich refractory material to oxidize at least a portion of the excess silicon and form a reinforced refractory material, wherein the reinforced refractory material includes a silicon dioxide phase at grain boundaries of the silicon carbide powder.

Example 22: The method of example 21, wherein the silicon carbide matrix defines less than about 10 percent by volume of the reinforced refractory material.

Example 23: The method of any of examples 21 and 22, wherein a porosity of the reinforced refractory material has a porosity that is less than or equal to about 5 volume percent (vol. %).

Example 24: The method of any of examples 21 through 23, wherein the silicon-rich refractory mixture further comprises silicon powder.

Example 25: The method of any of examples 21 through 24, further comprising forming the refractory mixture by at least mixing the silicon-rich silicon carbide preceramic polymer and the silicon carbide powder.

Example 26: The method of any of examples 21 through 25, wherein the preform is defined by a first volume, wherein the refractory component is defined by a second volume, and wherein a difference between the first volume and the second volume is less than about five percent by volume.

Example 27: The method of any of examples 21 through 26, wherein forming the preform from the refractory mixture comprises: applying the refractory mixture into a mold having a predetermined shape; and compressing the refractory mixture in the mold.

Example 28: The method of example 27, wherein heating the preform further comprises, after compressing the refractory mixture, heating the preform in the mold.

Example 29: The method of any of examples 21 through 28, wherein heating the preform further comprises heating the silicon carbide preceramic polymer above a pyrolysis temperature to pyrolyze the silicon carbide preceramic polymer into the silicon carbide matrix.

Example 30: The method of example 29, wherein heating the preform further comprises heating the silicon carbide matrix above a crystallization temperature to crystallize the silicon carbide matrix.

Example 31: The method of any of examples 21 through 30, wherein the refractory component defines an oxidation-resistant surface configured to contact molten metal.

Example 32: The method of any of examples 21 through 31, wherein the refractory component comprises at least one of an interior portion of a vessel for contacting molten metal, a ladle, a slide gate, or a liner.

Example 33: A refractory component includes a reinforced refractory material includes a polymer-derived silicon carbide matrix; a silicon carbide powder in the silicon carbide matrix; and a silicon dioxide phase at grain boundaries of the silicon carbide powder.

Example 34: The refractory component of example 33, wherein the silicon carbide matrix comprises less than about 10 percent by volume of the reinforced refractory material.

Example 35: The refractory component of any of examples 33 and 34, wherein the silicon dioxide phase comprises less than about 1 percent by volume of the reinforced refractory material.

Example 36: The refractory component of any of examples 33 through 35, wherein a porosity of the reinforced refractory material is less than or equal to about 5 volume percent (vol. %).

Example 37: The refractory component of any of examples 33 through 36, wherein the reinforced refractory material further comprises silicon powder.

Example 38: The refractory component of any of examples 33 through 37, wherein the refractory component defines an oxidation-resistant surface configured to contact molten metal.

Example 39: The refractory component of example 38, wherein the refractory component comprises an interior portion of a vessel, and wherein the oxidation-resistant surface of the refractory component is configured to contact molten metal.

Example 40: The refractory component of any of examples 33 through 39, wherein the refractory component comprises at least one of an interior portion of a vessel for contacting molten metal, a ladle, a slide gate, or a liner.

Various examples have been described. These and other examples are within the scope of the following claims.

What is claimed is:

1. A method comprising:
    forming a coating on a substrate, wherein the coating is formed from a silicon-rich refractory mixture that comprises:
        a silicon-rich silicon carbide preceramic polymer; and
        a silicon carbide powder;
    heating the coating to pyrolyze the silicon-rich silicon carbide preceramic polymer and form a silicon-rich refractory material, wherein the silicon-rich refractory material comprises the silicon carbide powder and excess silicon in a polymer-derived silicon carbide matrix; and
    heating the silicon-rich refractory material to oxidize at least a portion of the excess silicon and form a reinforced refractory material, wherein the reinforced refractory material includes a silicon dioxide phase comprising a boundary phase at grain boundaries of the silicon carbide powder and a pore phase at pores within the polymer-derived silicon carbide matrix.

2. The method of claim 1, wherein the polymer-derived silicon carbide matrix defines less than about 10 percent by volume of the reinforced refractory material.

3. The method of claim 1, wherein a porosity of the reinforced refractory material has a porosity that is less than or equal to about 5 volume percent (vol. %).

4. The method of claim 1, wherein the silicon-rich refractory mixture further comprises silicon powder.

5. The method of claim 1, further comprising forming the refractory mixture by at least mixing the silicon-rich silicon carbide preceramic polymer and the silicon carbide powder.

6. The method of claim 1, wherein heating the coating further comprises heating the silicon-rich silicon carbide preceramic polymer above a pyrolysis temperature to pyrolyze the silicon-rich silicon carbide preceramic polymer into the polymer-derived silicon carbide matrix.

7. The method of claim 6, wherein heating the coating further comprises heating the polymer-derived silicon carbide matrix above a crystallization temperature to crystallize the polymer-derived silicon carbide matrix.

8. The method of claim 1, further comprising, prior to forming the coating on the substrate, forming a metal carbide layer on the substrate, wherein the coating is formed on a surface of the metal carbide layer.

9. The method of claim 8, wherein forming the metal carbide layer further comprises:
    depositing a carbon layer on a surface of the substrate, wherein a melting point of the substrate is greater than or equal to about 1500 degrees Celsius (° C.);
    applying a metal slurry to a surface of the carbon layer following the deposition of the carbon layer; and
    reacting a metal of the metal slurry with carbon of the carbon layer to form the metal carbide layer on the substrate.

10. The method of claim 9,
    wherein a porosity of the substrate is greater than about 10 percent by volume (vol. %), and
    wherein a porosity of the metal carbide layer is less than about 5 vol. %.

11. The method of claim 9,
    wherein the metal of the metal slurry comprises silicon, and
    wherein the metal carbide layer comprises silicon carbide.

12. An article, comprising:
    a substrate; and
    a coating overlying the substrate, wherein the coating comprises a reinforced refractory material comprising:
        a polymer-derived silicon carbide matrix;
        a silicon carbide powder in the polymer-derived silicon carbide matrix; and
        a silicon dioxide phase comprising a boundary phase at grain boundaries of the silicon carbide powder and a pore phase at pores within the polymer-derived silicon carbide matrix.

13. The article of claim 12, wherein the polymer-derived silicon carbide matrix comprises less than about 10 percent by volume of the reinforced refractory material.

14. The article of claim 12, wherein the silicon dioxide phase comprises less than about 1 percent by volume of the reinforced refractory material.

15. The article of claim 12, wherein a porosity of the reinforced refractory material is less than or equal to about 5 volume percent (vol. %).

16. The article of claim 12, wherein the reinforced refractory material further comprises silicon powder.

17. The article of claim 12, wherein the substrate comprises a component of an aerospace system.

18. The article of claim 12, further comprising a metal carbide layer on a surface of the substrate, wherein the coating overlies the metal carbide layer, and wherein a melting point of the substrate is greater than or equal to about 1500 degrees Celsius (° C.).

19. The article of claim 18, wherein the metal carbide layer comprises silicon carbide.

20. The article of claim 18, wherein the pore phase is discrete and separate from the boundary phase.

* * * * *